United States Patent

Wada

[11] Patent Number: 5,844,719
[45] Date of Patent: Dec. 1, 1998

[54] LIGHT DEFLECTION APPARATUS

[75] Inventor: Hiroyuki Wada, Yokohama, Japan

[73] Assignee: Canon Kabushiki Kaisha, Tokyo, Japan

[21] Appl. No.: 736,962

[22] Filed: Oct. 25, 1996

Related U.S. Application Data

[63] Continuation of Ser. No. 309,631, Sep. 21, 1994, abandoned, which is a continuation-in-part of Ser. No. 164,528, Dec. 10, 1993, abandoned.

[30] Foreign Application Priority Data

| Dec. 11, 1992 | [JP] | Japan | 4-352360 |
| Dec. 11, 1992 | [JP] | Japan | 4-352361 |
| Jun. 1, 1994 | [JP] | Japan | 6-119970 |

[51] Int. Cl.$^6$ ............... G02B 27/64; G02B 5/04
[52] U.S. Cl. ............ 359/557; 359/554; 359/831; 359/832
[58] Field of Search ............... 359/554–557, 359/831, 832, 837; 354/477, 478, 70; 396/52–55

[56] References Cited

U.S. PATENT DOCUMENTS

| 4,781,445 | 11/1988 | Baba et al. | 359/832 |
| 5,107,293 | 4/1992 | Sekine et al. | 359/554 |
| 5,168,385 | 12/1992 | Kobayashi et al. | 359/557 |
| 5,280,387 | 1/1994 | Maruyama | 359/557 |
| 5,311,367 | 5/1994 | Ohki et al. | 359/557 |
| 5,315,435 | 5/1994 | Horiuchi | 359/557 |

FOREIGN PATENT DOCUMENTS 3-63633  3/1991  Japan .

*Primary Examiner*—Thong Nguyen
*Attorney, Agent, or Firm*—Fitzpatrick, Cella, Harper & Scinto

[57] ABSTRACT

A light deflection apparatus includes an optical device for deflecting light, and a spherical guide for guiding the light deflected by the optical device.

11 Claims, 13 Drawing Sheets

LIGHT DEFLECTION APPARATUS

This application is a continuation of application Ser. No. 08/309,631 filed Sept. 21, 1994, which is a continuation-in-part of application No. Ser. 08/164,528 filed Dec. 10, 1993.

BACKGROUND OF THE INVENTION

1. Field of the Invention

The present invention relates to an improvement in a light deflection apparatus comprising light deflection means such as a variable (apical) angle prism used in photographing apparatuses such as still cameras and video cameras, or in optical apparatuses such as stereoscopes and binoculars.

2. Related Background Art

In recent years, photographing apparatuses such as still cameras, video cameras, and the like have advanced automatic functions, and those having auto-exposure and auto-focusing functions, and the like have been widely used in practical applications. Furthermore, techniques for realizing an image blur correction function, which corrects an image blur caused by a fluctuation of the entire apparatus have been proposed, and some of these techniques have been put into practical applications.

For example, FIG. 8 shows a schematic arrangement of a conventional photographing apparatus for performing an image blur correction using light deflection means.

Referring to FIG. 8, a liquid (not shown) having a high refractive index is filled in a space sealed by two opposing transparent plates 102a and 102b, and a film 103 for sealing the outer circumferential surfaces of these plates, thereby constituting a variable (apical) angle prism.

The variable angle prism is clamped between frame members 104a and 104b. The frame members 104a and 104b support the transparent plates 102a and 102b constituting a portion of the variable angle prism to allow its pivotal movement about a pitch axis 105a and a yaw axis 105b. A flat coil 106a is fixed to one end of the front frame member 104a. Permanent magnets 107a, and yokes 108a and 109a are arranged to oppose the two surfaces of the flat coil 106a, and these components constitute a closed magnetic circuit. An arm portion 111a is integrally formed on the frame member 104a, and has a slit 110a. A light-emitting element 112a such as an IRED,(infared light emitting device) and a light-receiving element 113a such as a PSD (photosensitive diode) whose output changes depending on the spot position of a received light beam are arranged at opposing positions sandwiching the slit 110a therebetween. A light beam emitted from the light-emitting element 112a passes through the slit 110a, and irradiates the light-receiving element 113a.

Fluctuation detection equipment 114a and 114b are attached to a support portion of the apparatus so as to be able to detect fluctuation amounts in the pitch and yaw directions of the apparatus as a whole. A control circuit 115 such as a microcomputer controls the overall apparatus. A moving coil circuit 116 drives the flat coil 106a in accordance with a driving signal supplied from the control circuit 115. The flat coil 106a has a point 117 of action, which is invisible in a space.

Although not described above with reference to FIG. 8, a flat coil 106b, permanent magnets 107b, yokes 108b and 109b, a slit 10b, an arm portion 111b, a light-emitting element 112b, and a light-receiving element 113b are arranged in the yaw direction as well.

The operation of the apparatus with the above-mentioned arrangement will be described below.

The control circuit 115 determines the coil driving amount by which the coil 106a is driven by the moving coil circuit 116 in accordance with fluctuation amount signals from the fluctuation detection equipment 114a and 114b, and optical axis change signals of the variable angle prism from the light-receiving elements 113a and 113b. This driving amount is input to the magnetic circuits in the pitch and yaw directions with the above-mentioned arrangement, and driving forces generated by these circuits are transmitted to the frame members 104a and 104b. The variable angle prism held by these frame members 104a and 104b is then pivoted about the pitch axis 105a and the yaw axis 105b. Thus, light incident from a position in front of the frame member 104a is transmitted through the variable angle prism, and its optical axis changes. As a result, an image blur correction is attained.

However, in this arrangement, for example, in order to protect the rotational shaft and the transparent plate for pitch or yaw correction on the object side or actuators for driving these members, another transparent plate (not shown) must be arranged in front (on the object side) of the transparent plate 102a or 102b, and the thickness of the structure in the optical axis direction undesirably increases accordingly. Since the pitch and yaw axes 105a and 105b are independently driven, separate mechanisms are required, resulting in an increase in the number of components, and a complicated mechanical arrangement.

As disclosed in Japanese Laid-Open Patent Application No. 3-63633, if the object-side transparent plate of the variable angle prism is fixed, and the image-side transparent plate is pivoted about the pitch and yaw axes by a gimbal mechanism, the above-mentioned problem can be solved. However, when such a gimbal mechanism is adopted, the structure undesirably becomes complicated and large in size.

In the case of the gimbal mechanism, it is practically difficult to achieve completely independent drive operations in the yaw and pitch directions. More specifically, the driving amount of the driving point in the pitch direction, and the inclination of the light deflection means with respect to an image pickup plane change depending on the position of the driving point in the yaw direction, and the driving amount of the driving point in the yaw direction, and the inclination of the light deflection means with respect to the image pickup plane change depending on the position of the driving point in the pitch direction. However, Japanese Laid-Open Patent Application No. 3-63633 does not consider such problems at all.

SUMMARY OF THE INVENTION

The present invention has been made in consideration of the above situation, and has as its object to provide a light deflection apparatus which has a simple structure and high precision.

In order to achieve the above object, according to one aspect of the present invention, there is provided a light deflection apparatus comprising: optical means for deflecting light; and spherical guide means for guiding the light deflected by the optical means for light deflection.

According to another aspect of the present invention, there is provided a light deflection apparatus comprising: optical means for deflecting light; and a plurality of pivot centers for defining a deflection state of the optical means, at least one of the plurality of pivot centers being movably and generating a driving force.

According to still another aspect of the present invention, there is provided a light deflection apparatus comprising: a stationary member; a deformable transparent material; a movable optical member, arranged on a side opposite to the stationary member to sandwich the transparent material, for deflecting a passing light beam by displacement, and a coupling member forming, with the stationary member and the movable optical member, a space for sealing the transparent material by coupling the stationary member and the movable optical member, and having a rigidity not to be improperly deformed due to the weight of the transparent material, the weight of the movable optical member, and the weight of the coupling member.

Other aspects of the present invention will become apparent from the following embodiments.

DETAILED DESCRIPTION OF THE PREFERRED EMBODIMENTS

The preferred embodiments of the present invention will be described hereinafter with reference to the accompanying drawings.

Figure 1:
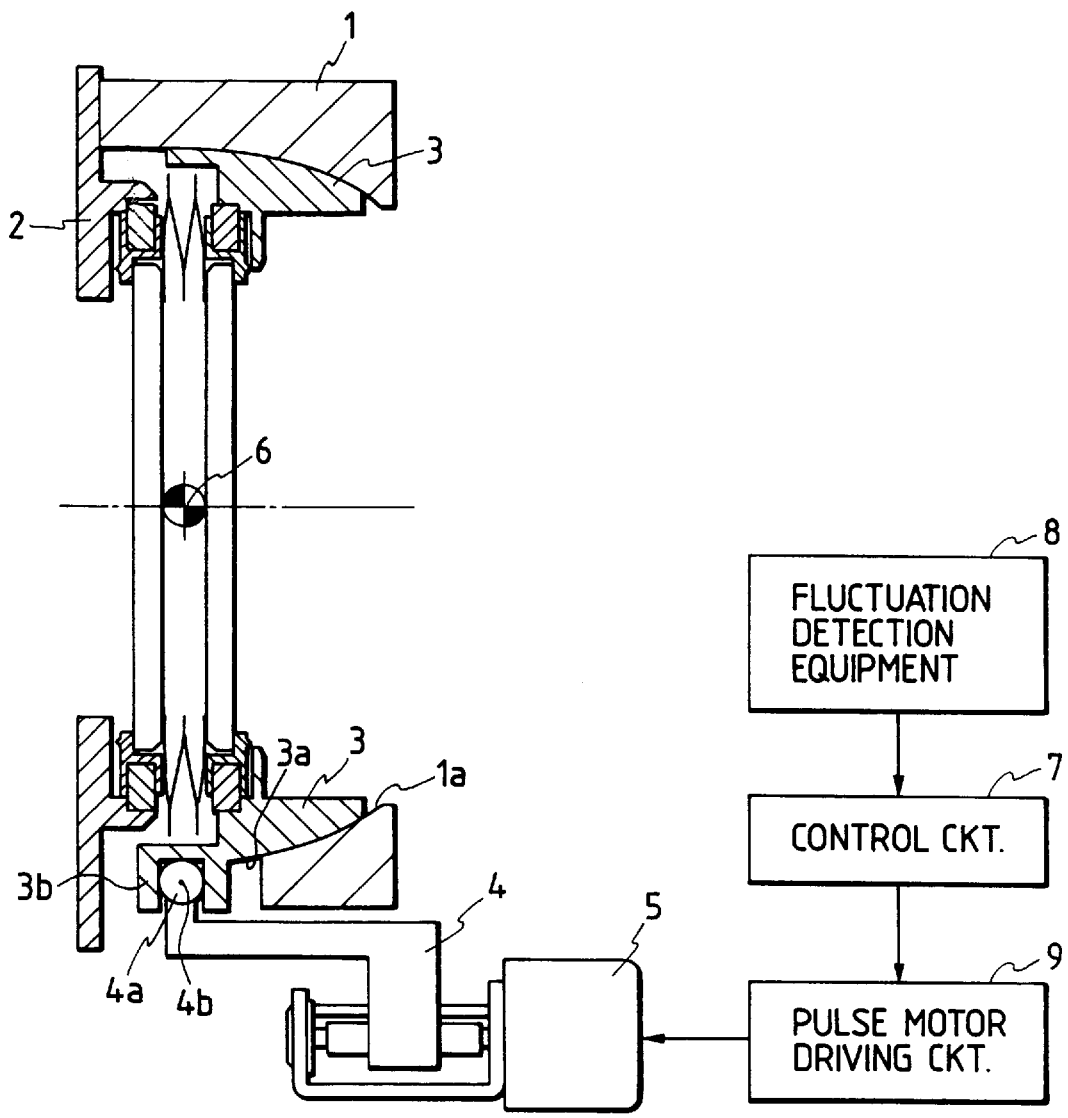
FIG. 1 is a schematic view showing a mechanism and a circuit arrangement of a main part of a light deflection apparatus according to the first embodiment of the present invention.

FIG. 1 shows a mechanism and a circuit arrangement of a main part of a light deflection apparatus according to the first embodiment of the present invention, and the following description will be made under the assumption that the apparatus of the present invention is arranged in a photographing apparatus with an image blur correction function.

Referring to FIG. 1, a fixing frame 1 holds a frame member 2 on the object side, which clamps a variable (apical) angle prism constituted by two transparent plates and the like. The frame member 2 holds one transparent plate of the variable angle prism. A frame member 3 on the image pickup plane side holds the other transparent plate of the variable angle prism, and the spherical center of a convex spherical surface 3a as the outer circumferential surface of the frame member 3 is arranged at a point substantially coinciding with an imaginary center 6 of the variable angle prism. The spherical center of the convex spherical surface 3a can be arranged at an arbitrary point on the optical axis. In this embodiment, in order to suppress the rotational torque of the transparent plates of the variable angle prism, the spherical center of the convex spherical surface 3a is arranged at the point coinciding with the center of the variable angle prism. A concave spherical surface 1a having the same spherical center as that of the convex spherical surface 3a is formed on the inner wall of the fixing frame 1 to fit on the frame member 3 on the image pickup plane side. When these concave and convex spherical surfaces 1a and 3a smoothly slide, the transparent plate on the image side is freely pivotal in the pitch and yaw directions about the spherical centers of the concave and convex spherical surfaces 1a and 3a.

As shown in FIG. 1, an arm portion 3b is integrally formed on the frame member 3 on the image pickup plane side. The arm portion 3b has a "U-shaped" section directed in the radial direction. When a ball portion 4a as a joint portion is fitted in this U-shaped portion, the movement of the ball portion 4a is restricted in only a direction parallel to the optical axis, and is free in the radial direction and the circumferential direction. The ball portion 4a is integrally formed at the distal end of a rack 4 coupled to a pulse motor 5 by a screw.

Figure 2:
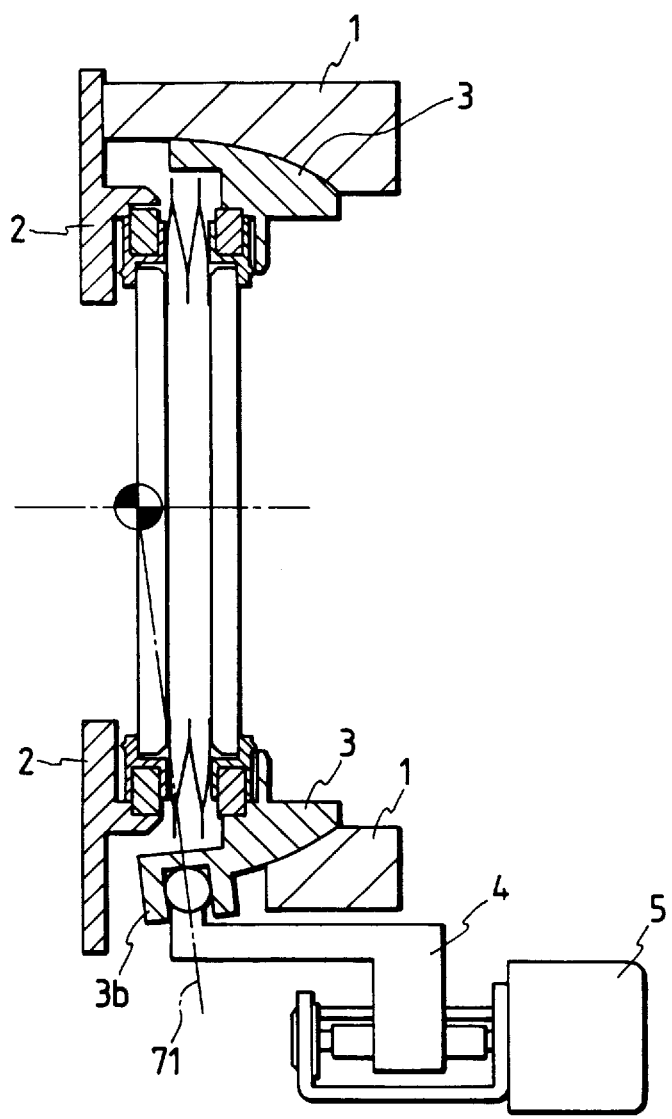
FIG. 2 is a sectional view for explaining an ideal holding state of a variable angle prism shown in FIG. 1.

Note that the "U shape" is preferably formed to be substantially parallel to an imaginary line 71 which passes through the spherical center and extends in the radial direction even when the position of the spherical center on the optical axis is different from that in FIG. 1, as shown in FIG. 2, since the thrust loss of the pulse motor 5 as an actuator is reduced with such a "U shape".

Two pulse motors 5 (only one is shown in FIG. 1) are arranged at two positions, i.e., the lower position and the side position of the variable angle prism on the circumferential surface of the variable angle prism to have a phase interval of about 90°. These two pulse motors 5 are coupled to separate racks 4 (only one is shown in FIG. 1 and another one is the same structure) by screws, and these racks 4 are coupled to separate frame member arm portions 3b on the image side, thus constituting a total of two joint portions.

The operation of the variable angle prism driving mechanism with the above-mentioned arrangement will be described in turn below.

A case will be examined wherein one (e.g., the yaw motor) of the pulse motors is fixed, and the other pulse motor (e.g., the pitch motor) is driven.

Referring to FIG. 1, when the pitch pulse motor 5 is driven, the rack 4 moves in the optical axis direction (the left direction in FIG. 1) according to the lead of the screw, and the frame member arm portion 3b on the image pickup plane side also moves in the optical axis direction accordingly. At this time, since the ball portion 4a formed at the distal end portion of the rack 4 is coupled to the frame member arm portion 3b on the image pickup plane side in a state wherein movement in only the direction parallel to the optical axis is restricted, a linear motion of the rack 4 is converted into a rotation about the center 6 of the variable angle prism. Furthermore, since the yaw pulse motor 5 is fixed, the frame member 3 on the image pickup plane side rotates in the pitch direction centered in an axis which runs to the center 6 of the variable prism and to the center of the ball portion formed at the distal end portion of the rack in yaw side.

More specifically, the inclination of one transparent plate of the variable angle prism with respect to the image pickup plane is determined by a total of three rotating center points, i.e., the spherical center 6, and the centers of the ball portions 4a and 4a' formed at the distal end portions of the two racks 4.

FIG. 1 illustrates a state wherein the movable transparent plate extends substantially perpendicular to the optical axis, i.e., an image blur prevention (image blur correction) OFF state. In this state, three points, i.e., a center 4b of the ball portion 4a formed at the distal end of the rack 4, a center 4b' of the ball portion 4a' formed at the distal end of the other rack 4 (not shown), and the spherical center 6, are located at positions which coincide with each other in the optical axis direction. Therefore, a plane defined by these three points is perpendicular to the optical axis.

The relationship between the rack moving amount and the correction angle when the pulse motors 5 are driven from the above-mentioned state is given by:

$$\theta_p = \tan^{-1} [-L_p/\sqrt{(L_p^2 + L_y^2)} \cdot \tan\{(n_d - 1) \cdot \cos^{-1}(R\sqrt{L_p^2 + L_y^2 + R^2})\}] \quad (1)$$

$$\theta_y = \tan^{-1} [-L_y/\sqrt{(L_p^2 + L_y^2)} \cdot \tan\{(n_d - 1) \cdot \cos^{-1}(R\sqrt{L_p^2 + L_y^2 + R^2})\}] \quad (2)$$

Figure 3:
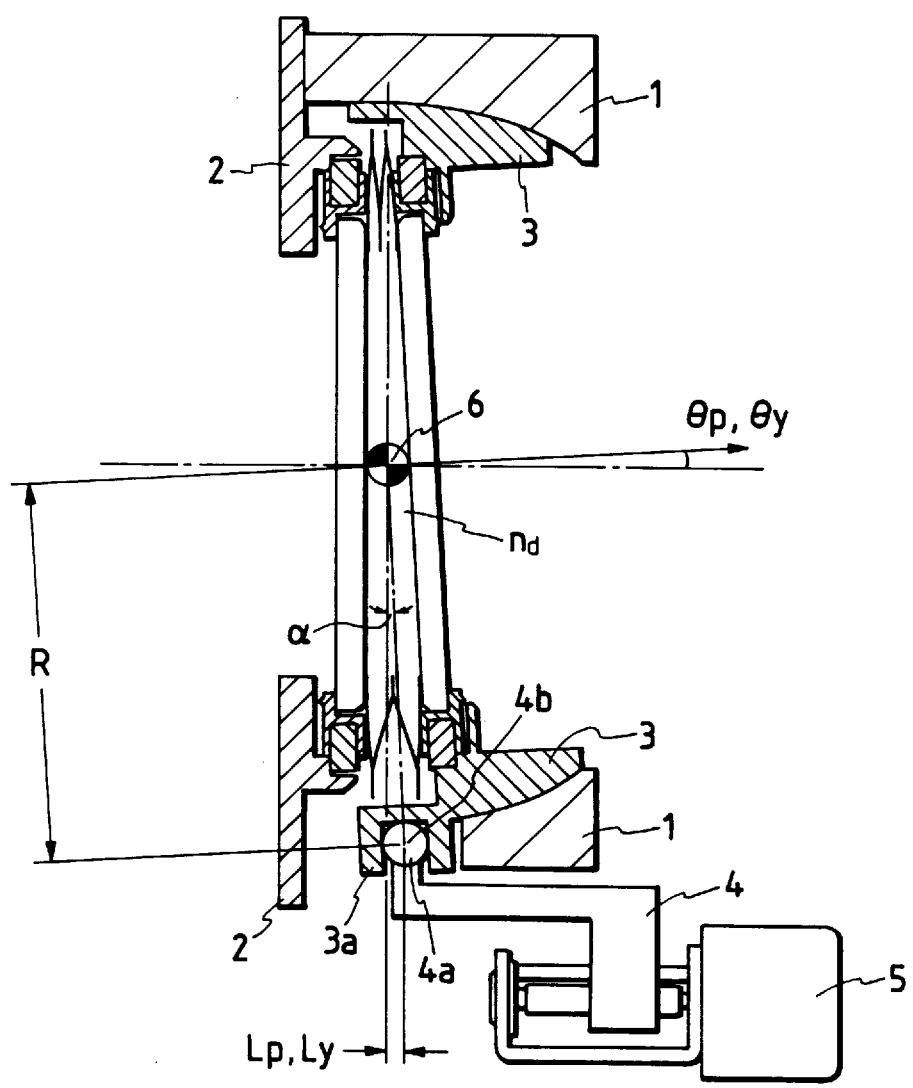
FIG. 3 is a sectional view for explaining the independence of the driving operations in the pitch and yaw directions of light deflection means in the first embodiment of the present invention.

Note that symbols in equations (1) and (2) above are as follows. That is, as shown in FIG. 3, $\Lambda_p$ and $\Lambda_y$ are the correction angles in the pitch and yaw directions, $L_p$ and $L_y$ are moving amounts, in the pitch and yaw directions, in the optical axis direction of the racks 4 when the pulse motors 5 are driven from the image blur prevention OFF state shown in FIG. 1, $n_d$ is the refractive index of a liquid filled in a space defined by the two transparent plates and bellows of the variable angle prism, R is the distance from the spherical center to the centers 4b and 4b' of the ball portions 4a and 4a' at the distal ends of the racks (assume that distances in the pitch and yaw directions are equal to each other).

Figure 4:
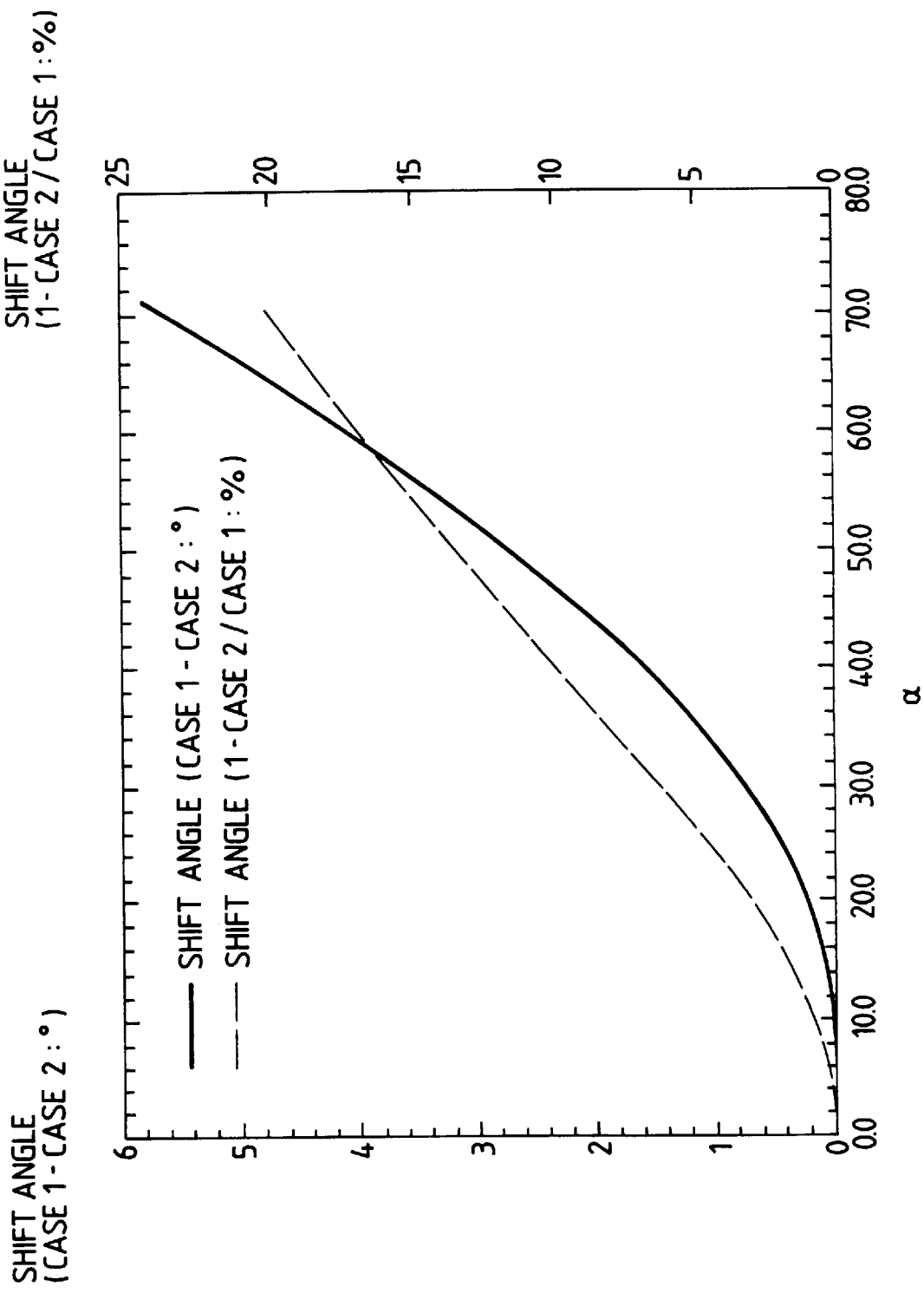
FIG. 4 is a graph showing the independence of the driving operations in the pitch and yaw directions of light deflection means in the first embodiment of the present invention.

FIG. 4 shows independence of the pitch and yaw directions on the basis of equations (1) and (2) above. In FIG. 4, R=20, and FIG. 4 shows the difference obtained upon execution of the following two types of driving operations (case 1 and case 2; to be described below).

Case 1 represents a correction angle in the pitch direction obtained when one (e.g., the yaw motor) of the two pulse motors is fixed to have $L_y$=0, and the other motor (e.g., the pitch motor) is driven from $L_p$=0, and case 2 represents a correction angle in the pitch direction obtained when both the motors (the pitch and yaw motors) are driven from $L_y$=0 and $L_p$=0.

Therefore, if case 1 and case 2 have equal correction angles, this means that the pitch and yaw directions are independent of each other. However, in practice, as shown in FIG. 4, a shift between case 1 and case 2 increases as the angle increases, and independence of the pitch and yaw directions are lost as the angle increases.

However, near $L_y$=0 and $L_p$=0, i.e., near $\alpha$=0, the shift between case 1 and case 2 is small, and the pitch and yaw directions can be substantially independently driven although it depends on the system to be used. For example, when $L_y$ and $L_p$ are changed up to $\alpha$=4° in case 1 and case 2, the shift amount between the correction angles at that time is "0.0022°". Assuming that an optical system having a focal length f $\alpha$=80 mm is arranged on the image pickup plane side of the variable angle prism, and the above-mentioned shift amount is converted into a shift amount on the image pickup plane, the shift amount is represented by "80.tan0.0022°=3 $\mu$m", and corresponds to about ½ a pixel for a ⅓" CCD. This value is sufficiently small and negligible when the variable angle prism is used in image blur prevention of a video camera, and indicates that the pitch and yaw directions can be independently driven.

In other words, when the variable angle prism is set in an image blur prevention OFF neutral state, if the plane defined by three points, i.e., the center 4b of the ball portion 4a at the distal end of the rack, the center 4b' of the ball portion 4a' at the distal end of the other rack (not shown), and the spherical center is designed to be perpendicular to the optical axis, the pitch and yaw directions can be more independently driven, and their driving states can be detected (the driving amounts correspond to the detection amounts since the pulse motors are used in the driving operations).

Further, it is not necessary that the plane defined by three points is designed to be perpendicular to the optical axis when image blur prevention is OFF. A structure also may be available in which a state described above exists in an arbitrary position during which image blur prevention is ON.

An image blur prevention system using the above-mentioned variable angle prism driving mechanism will be described below.

Referring to FIG. 1, the image blur prevention system includes fluctuation detection equipment 8 (only one is shown in FIG. 1) for detecting fluctuations in both the pitch and yaw directions, a control circuit 7 such as a microcomputer for controlling the pulse motors 5 on the basis of the outputs from the detection equipments 8, and a pulse motor driving circuit 9 for driving the pulse motors 5 in accordance with the control circuit 7 in addition to the above-mentioned mechanism. Note that each of the fluctuation detection equipment 8 in the pitch and yaw directions may comprise an angular velocity detector such as a gyro, and an integration circuit for integrating the output from the detector.

The relationship between the rotor rotational angle per pulse of the pulse motor 5 and the screw pitch, i.e., the moving amount of the rack 4 per pulse of the pulse motor 5 and the rotational angle of the transparent plate as one constituting member of the variable angle prism are set in advance to be predetermined values. If the focal length of a lens inserted on the image pickup element side of the variable angle prism is known, an image shift amount on the image pickup plane, which is generated per pulse, can also be known (the rotational angle of the transparent plate per pulse is preferably set to be a value which causes an image shift on the image pickup plane to be sufficiently smaller than one pixel). Therefore, when the image blur amount of the lens is detected from the outputs from the fluctuation detection equipment 8, and the control circuit 7 such as a microcomputer calculates drive amounts of the pulse motors 5 so as to cancel the image blur amount, the image blur amount can be corrected. Note that the control circuit 7 may comprise an analog circuit.

Figure 5:
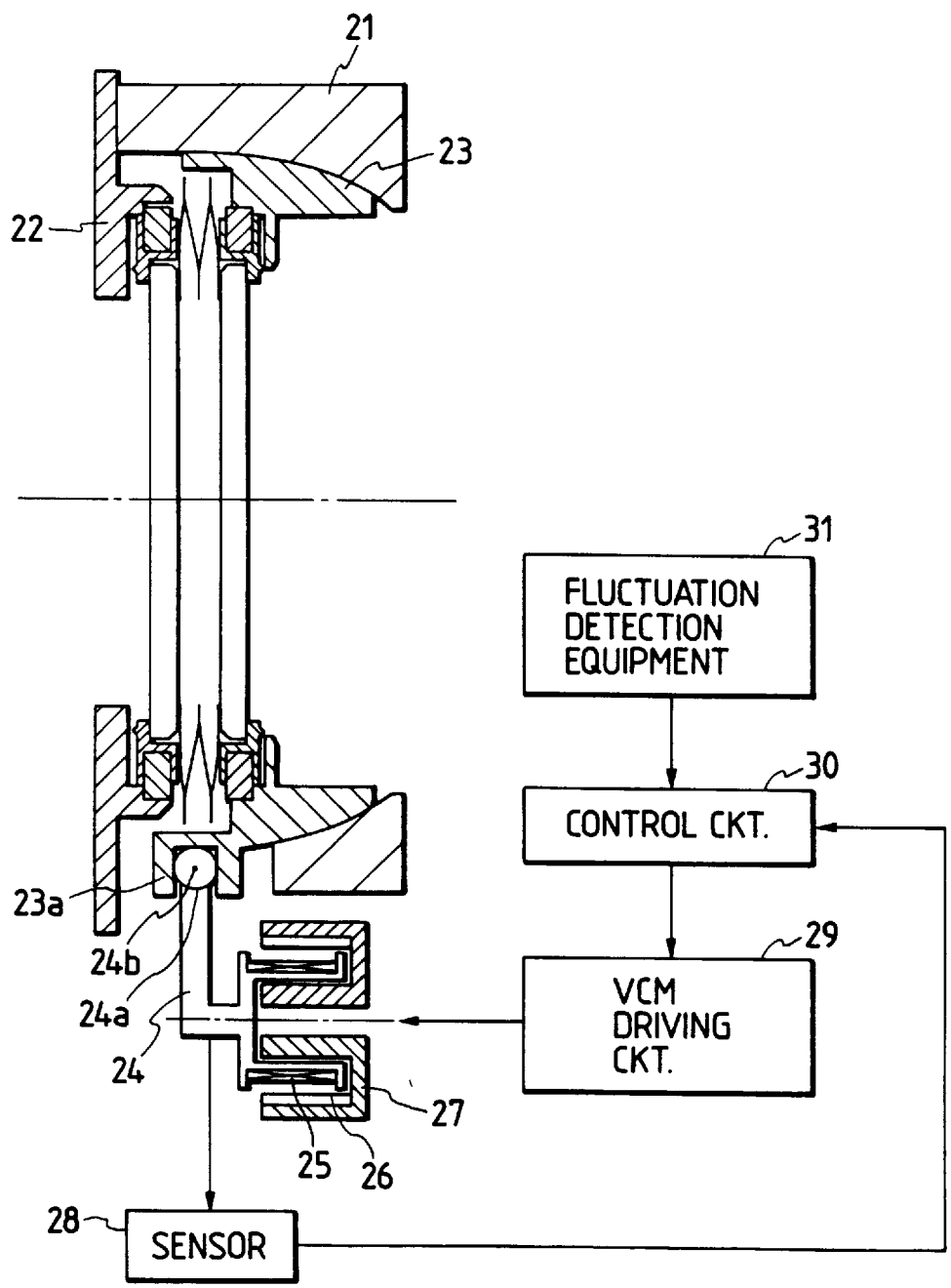
FIG. 5 is an exploded perspective view showing a mechanism of main part of a light deflection apparatus according to the second embodiment of the present invention.

FIG. 5 shows a mechanism and a circuit arrangement of a main part of a light deflection apparatus according to the second embodiment of the present invention, and the following description will be made under an the assumption that the apparatus of the present invention is arranged in a photographing apparatus with an image blur prevention function.

In this embodiment, a linear motor (e.g., a voice coil motor (VCM)) is used in a driving operation in place of a pulse motor. Therefore, the mechanical arrangement is substantially the same as that of the first embodiment, except that VCMs are used in place of the pulse motors.

Referring to FIG. 5, a fixing frame 21, and frame members 22 and 23 have the same shapes as those in FIG. 1, and the frame members 22 and 23 respectively hold an object-side transparent plate and an image pickup plane-side transparent plate as constituting members of a variable angle prism. A coil 25 is wound in a proper length around a bobbin 24. A ball portion 24a is formed at the distal end of the bobbin 24, and is coupled to a frame member arm portion 23a on the image pickup plane side. A permanent magnet 26 has a cylindrical shape, and is magnetized in the radial direction from its inner circumferential surface to its outer circumferential surface. A yoke 27 has a "U-shaped" section, and is coupled to the permanent magnet 26, as shown in FIG. 5. The members from the bobbin 24 to the yoke 27 constitute a VCM.

A sensor 28 detects the position, in the optical axis direction, of the bobbin 24. The sensor 28 may comprise a combination of a light-emitting element such as an IRED and a light-receiving element such as an PSD; a combination of a magnetoresistive element such as an MR element, a Hall element, or the like, and a magnet; a volume; or the like. A VCM driving circuit 29 for driving the VCM is connected to a control circuit 30 such as a microcomputer, and the control circuit 30 is connected to fluctuation detection equipment 31 for detecting fluctuations in the pitch and yaw directions. Note that FIG. 5 illustrates only one of each of the members 24 to 29 and 31, and does not illustrate the other one of these members. But structures of these members are the same.

In the second embodiment, since the driving mechanism and its operation are the same as those in the first embodiment, a detailed description thereof will be omitted, and an operation executed when an image blur prevention system is constituted using the above-mentioned arrangement will be described below.

Since the permanent magnet 26 and the yoke 27 are arranged, as described above, a magnetic flux is radially generated in the gap of the yoke 27. When the coil 25 is arranged in the gap, and a current flows through the coil, a force is generated in the coil 25 in a direction parallel to the optical axis in accordance with the Fleming's left-hand rule. Thus, the bobbin 24 moves in a direction parallel to the optical axis. The position, in the optical axis direction, of the bobbin 24 in this case is detected by the sensor 28 integrated with the bobbin 24. Since the sensor output, the transparent plate rotational angle, and the image blur amount on an image pickup element are designed to have a known relationship in advance, the VCMs are controlled by the control circuit 30 with feedback control so that the image blur amount coincides with the fluctuation amounts of the lens obtained from the fluctuation detection equipment 31, thus correcting the amount of image blur.

In the second embodiment as well, when the variable angle prism is set in an image blur prevention OFF neutral state, since a plane defined by three points, i.e., the ball portions 24a formed at the distal end of the two bobbins 24, and a spherical center 24b (the pivotal center of the frame member 23) is designed to be perpendicular to the optical axis, the same effect as in the first embodiment can be obtained. As well as the first embodiment, a structure also may be available in which a state of that the plane defined by three points is designed to be perpendicular to the optical axis exists in an arbitrary position during the time when image blur prevention is ON.

Furthermore, in this embodiment, since the linear motors (VCMs in this embodiment) are used in place of the pulse motors, a low-noise apparatus can be realized as compared to the first embodiment.

Figure 6:
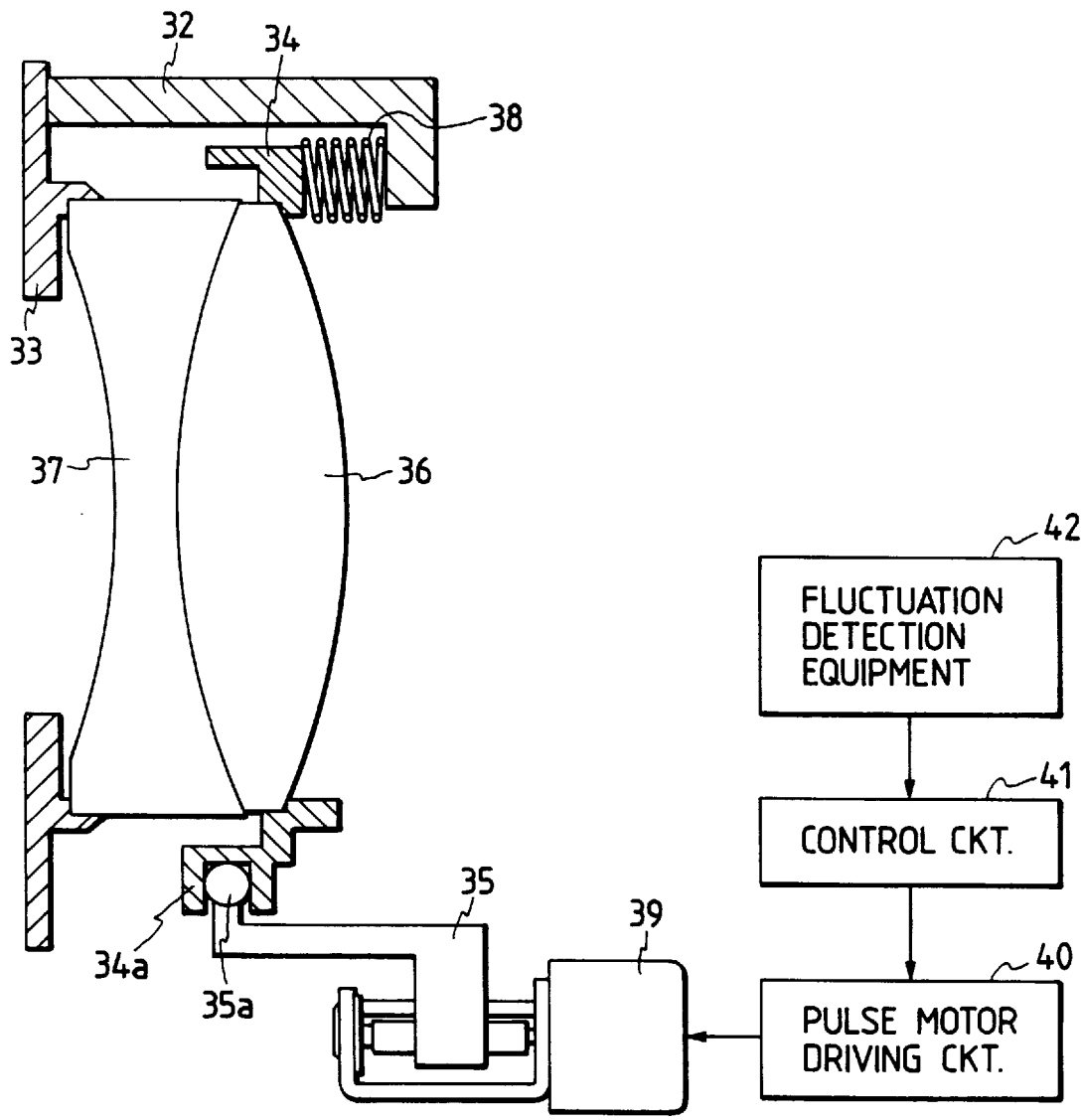
FIG. 6 is a schematic view showing a mechanism and a circuit arrangement of main part of a light deflection apparatus according to the third embodiment of the present invention.

FIG. 6 shows a mechanism and a circuit arrangement of main part of a light deflection apparatus according to the third embodiment of the present invention, and the following description will be made under an assumption that the apparatus of the present invention is arranged in a photographing apparatus with an image blur prevention function.

In this embodiment, image blur correction is performed using light deflection means comprising at least two lenses in place of the variable angle prism.

An apparatus shown in FIG. 6 comprises a fixing frame 32, a stationary lens holding frame 33, a movable lens holding frame 34, a rack 35, a convex lens 36, a concave lens 37, and springs 38 for biasing the convex lens 36 toward the concave lens 37 in a direction parallel to the optical axis. Although not shown, a plurality of springs 38 are arranged on the circumference of the lens 36.

An arm portion 34a is integrally formed on the movable lens holding frame 34. The arm portion 34a has a "U-shaped" section directed in the radial direction, and is coupled to a ball portion 35a as a joint portion integrally formed at the distal end of the rack 35, which is coupled to a pulse motor 39 by a screw. The movement of the ball portion 35a is restricted in only the direction parallel to the optical axis. The curvatures of the contact portions of the convex and concave lenses 36 and 37 substantially coincide with each other, and the convex lens 36 is spherically pivotable about the center, on the optical axis, of the contacting spherical surface with respect to the concave lens 37 held by the stationary lens holding frame 33. Therefore, when the pulse motor 39 is driven, the convex lens 36 is pivoted.

Assuming that a system for driving the pulse motors 39 is the same as that described in the first embodiment, and an image shift amount on an image pickup plane per pulse of the pulse motor 39 is known, the image blur amounts of the lens are detected from the outputs from fluctuation detection equipments 42, and a control circuit 41 calculates drive amounts of the pulse motors 39 so as to cancel the image blur amounts and drives the pulse motors 39 via a pulse motor driving circuit 40 accordingly, thereby correcting the amount of image blur.

Note that FIG. 6 illustrates only one each of the members 35, 39, 40, and 42, and does not illustrate the other one of these members. But structures of these unillustrated members are the same.

The third embodiment as well can provide the same effect as in the first embodiment and the like since the inclinations, in the pitch and yaw directions, of the light deflection means with respect to the image pickup plane are defined by the spherical portions 35a formed at the distal ends of the two racks 35, and the center (the pivotal center of the convex lens 36 with respect to the spherical surface of the concave lens 37) of the two lenses, i.e., the convex and concave lenses 36 and 37 constituting the light deflection means.

Figure 7:
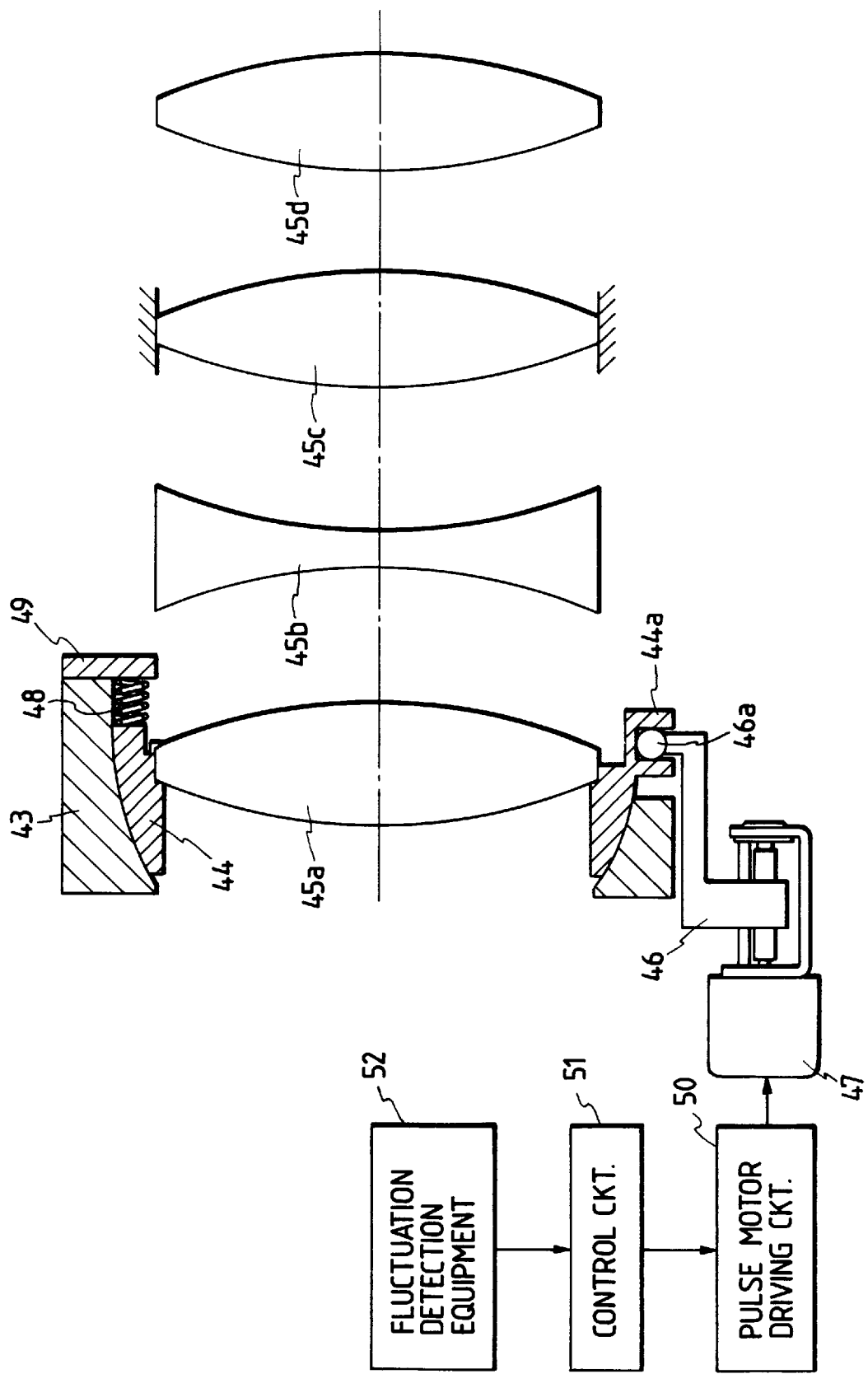
FIG. 7 is a schematic view showing a mechanism and a circuit arrangement of main part of a light deflection apparatus according to the fourth embodiment of the present invention.
Figure 8:
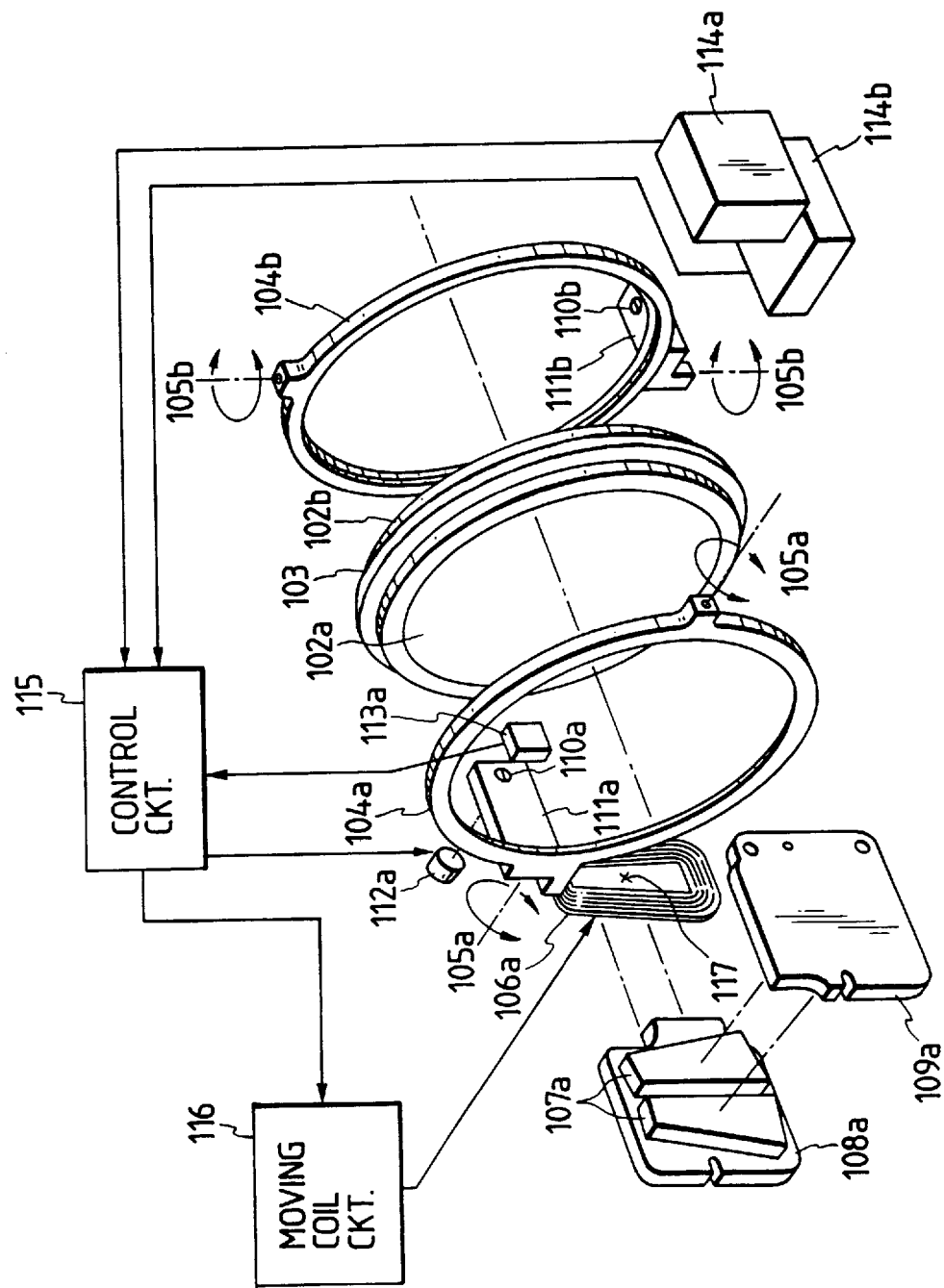
FIG. 8 is a schematic view showing a variable angle prism and its driving means as a conventional light deflection apparatus.

FIG. 7 shows a mechanism and a circuit arrangement of main part of a light deflection apparatus according to the fourth embodiment of the present invention, and the following description will be made under the assumption that the apparatus of the present invention is arranged in a photographing apparatus with an image blur prevention function.

In the third embodiment described above, the guide path of guide means (corresponding to the concave lens 37 in FIG. 5) for spherically guiding another member is recessed toward the object side. However, in this embodiment, the guide path of the guide means is recessed toward the image pickup plane side.

Referring to FIG. 7, lenses 45a to 45d constitute a single photographing optical system. As is well known, for example, the convex lens 45a of these lenses is pivoted about a designed point on the optical axis to deflect light, thereby realizing image blur correction. Therefore, upon application of an arrangement obtained by this embodiment, an image blur correction apparatus can be constituted.

The apparatus shown in FIG. 7 comprises a fixing frame 43, a lens holding frame 44, a rack 46, and springs 48 for biasing the lens holding frame 44 against the fixing frame 43. Although not shown, a plurality of springs 48 are arranged on the circumference. A fixing member 49 holds the fixing frame 43, and one-end portions of the springs 48.

The inner wall of the fixing frame 43 and the outer circumferential surface of the lens holding frame 44 have substantially the same curvatures, and have a spherical shape with an arbitrary point on the optical axis of the photographing optical system being a center. An arm portion 44a is integrally formed on the lens holding frame 44. The arm portion 44a has a "U-shaped" section directed in the radial direction, and is coupled to a ball portion 46a as a joint portion integrally formed at the distal end of the rack 46, which is coupled to a pulse motor 47 by a screw. The movement of the ball portion 46a is restricted in only the direction parallel to the optical axis. Therefore, when the pulse motor 47 is driven, the convex lens 45a is pivoted about the arbitrary point, on the optical axis, of the photographing optical system.

Assuming that a system for driving the pulse motors 47 is the same as that described in the first embodiment, and an image shift amount on an image pickup plane per pulse of the pulse motor 47 is known, the image blur amounts of the lens are detected from the outputs from fluctuation detection equipments 52, and a control circuit 51 calculates drive amounts of the pulse motors 47 so as to cancel the amount of image blur and drives the pulse motors 47 via a pulse motor driving circuit 50 accordingly, thereby correcting the amount of image blur.

Note that FIG. 7 illustrates only one each of the members 46, 47, 50, and 52, and does not illustrate the other one of these members. But structures of these unillustrated members are the same.

The fourth embodiment as well can provide the same effect as in the first embodiment and the like since the inclinations, in the pitch and yaw directions, of the light deflection means with respect to the image pickup plane are defined by the ball portions 46a formed at the distal ends of the two racks 46 and the center (the pivotal center of the convex lens 45a with respect to the spherical surface of the concave lens 45b) of the lenses 45a and 45b constituting the light deflection means.

The present invention will be described hereinafter in detail on the basis of the fifth embodiment illustrated in the accompanying drawings.

Figure 10:
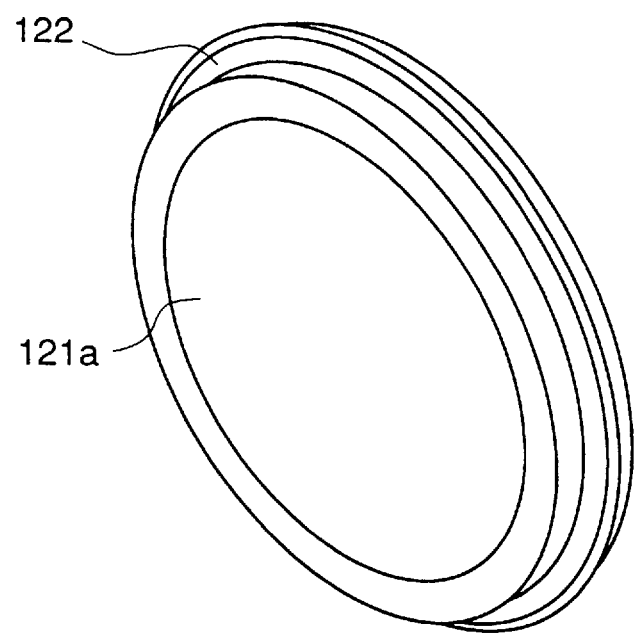
FIG. 10 is a schematic view showing a variable angle prism.

FIG. 10 shows in detail a variable angle prism used in an apparatus according to the fifth embodiment. A liquid (not shown) having a high refractive index is filled in a space sealed by two opposing transparent plates 121a and 121b (not shown), and a film 122 for sealing the outer circumferential surfaces of these plates, thereby constituting a variable angle prism.

Figure 11:
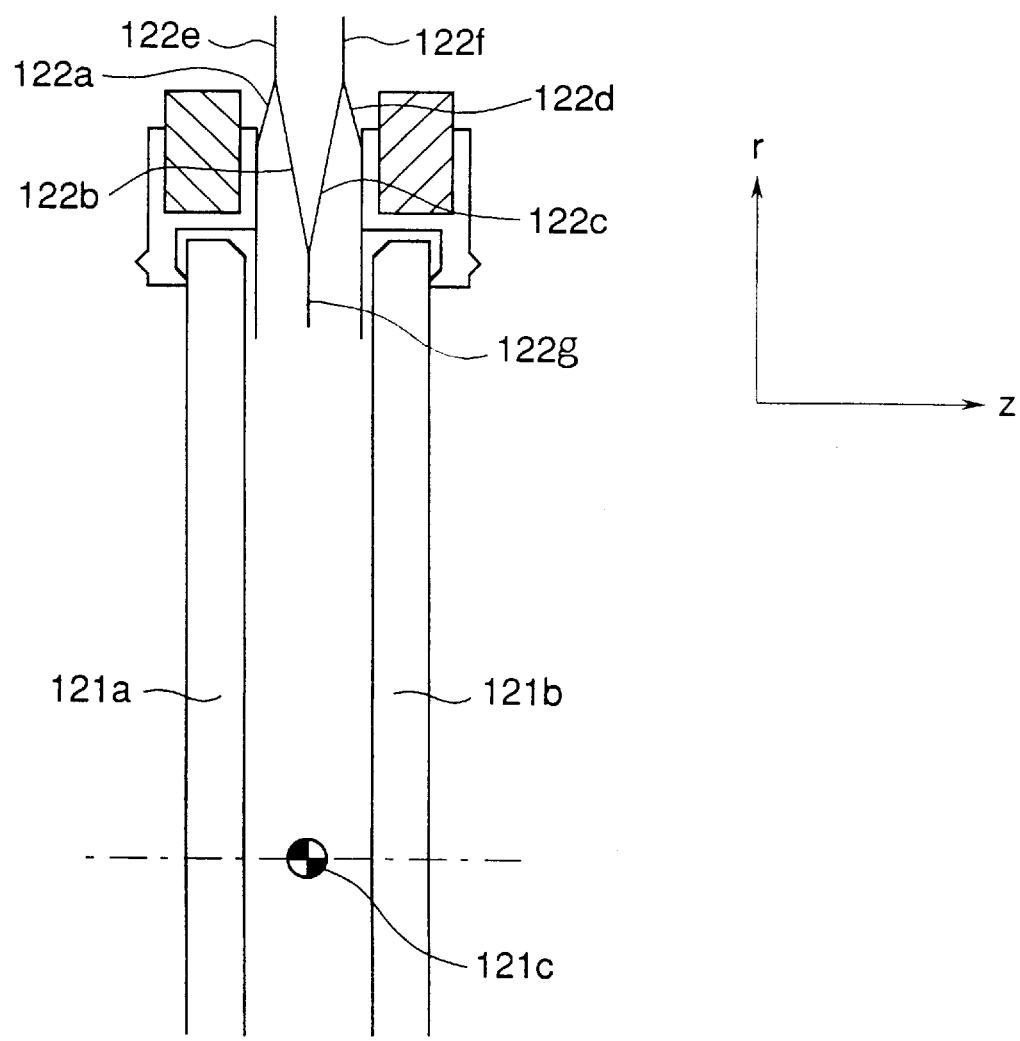
FIG. 11 is a sectional view showing the variable angle prism in detail.

FIG. 11 is a sectional view showing the variable angle prism in FIG. 10. As in FIG. 10, the variable angle prism has transparent plates 121a and 121b, and films 122a to 122g. The film 122 is constituted by the four films 122a to 122d in FIG. 11, and these films are respectively coupled to the adjacent films at portions 122e to 122g by a method of welding, bonding, or the like. (Note that the number of films need not be four, and an arbitrary number thereof can be set.) Since these coupling portions are formed on the circumferential surface as shown in FIG. 10, the transparent plates 121a and 121b have no degree of freedom in the radial direction (represented by r direction in FIG. 11). Since the volume of the liquid (not shown) having a high refractive index in the variable angle prism is constant, a change in thickness of the variable angle prism means that a force in the radial direction (r direction) is applied to the film coupling portions 122e to 122g. For this reason, no degree of freedom in the direction of thickness of the variable angle prism is obtained. That is, the variable angle prism with the arrangement shown in FIGS. 10 and 11 allows the transparent plates 121 to perform ball movement about the substantial center of the variable angle prism as an axis.

The above-mentioned centering function becomes valid when the films 122a to 122g have a sufficiently high rigidity, and the deformation amount of the films with respect to the weights of the liquid in the variable angle prism and movable portions (frame members, glass, and the like) is very small.

More specifically, when the films are greatly deformed due to these weights, the pivotal centers of the movable portions are undesirably shifted to generate, e.g., a refractive component in the pitch direction with respect to movement in the yaw direction, which is so-called crosstalk. When the movable-side transparent plate is driven by an actuator, this also applies to deformation of the films caused by this driving force.

Figure 9:
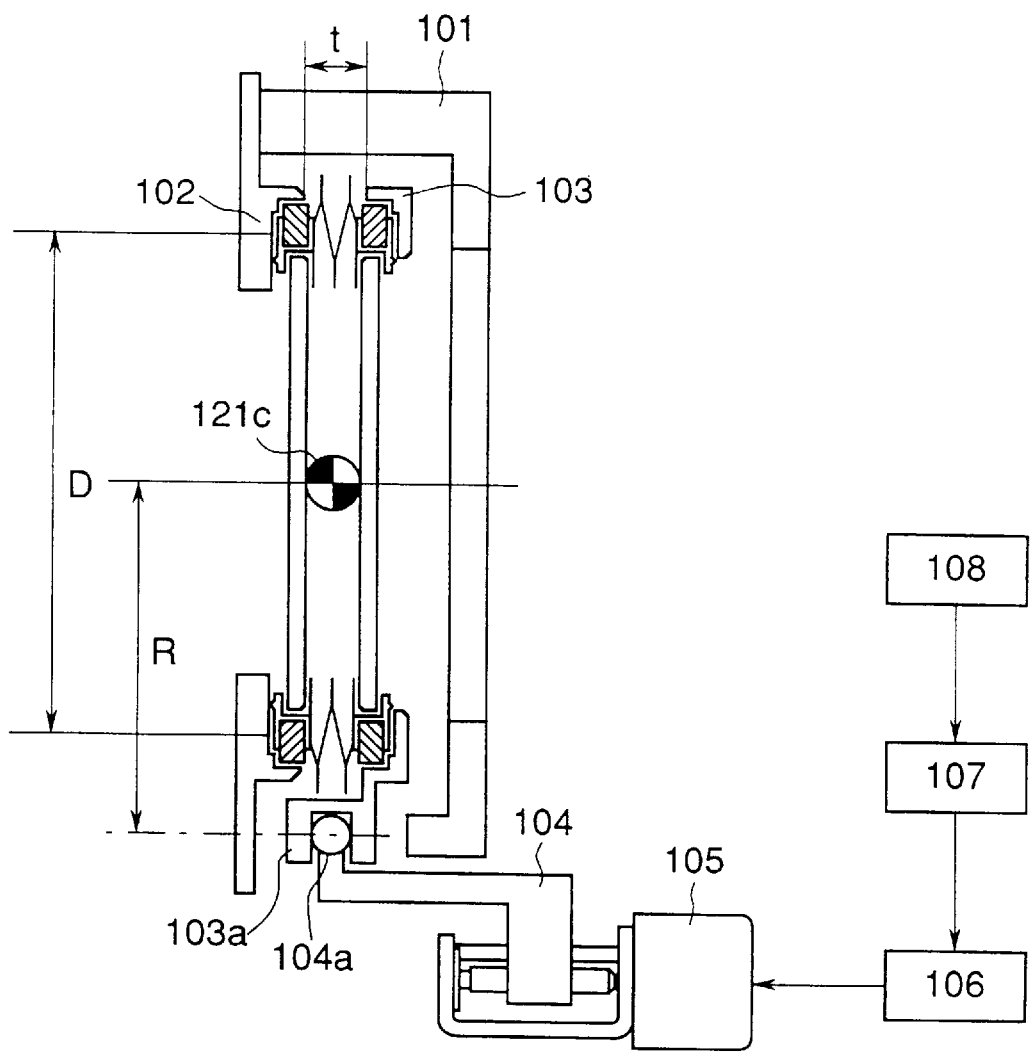
FIG. 9 is a schematic view showing a mechanism and a circuit arrangement of main part of an optical apparatus according to the fifth embodiment of the present invention.

FIG. 9 shows a mechanism and a circuit arrangement of main part of an optical apparatus according to the fifth embodiment of the present invention. Referring to FIG. 9, a frame member 102 clamps a variable angle prism. The frame member 102 on the object side holds one transparent plate of the variable angle prism, and is held by a fixing frame 101. An image-side frame member 103 holds the other transparent plate of the variable angle prism. The optical axis of a master lens is arranged at a point substantially coinciding with the center of the variable angle prism. With this arrangement, the image-side transparent plate can be freely pivotal in both the yaw and pitch directions using a point on the optical axis as a substantial center.

As shown in FIG. 9, an arm portion 103a is integrally formed on the image-side frame member 103. The arm portion 103a has a "U-shaped" section directed in the radial direction. When a ball is fitted in this U-shaped portion, the movement of the ball is restricted in only a direction parallel to the optical axis, and is free in the radial direction and the circumferential direction. The ball (represented by 104a in FIG. 9) is integrally formed at the distal end of a rack 104 coupled to a pulse motor 105 by a screw. Two pulse motors (only one is shown in FIG. 9) are arranged at two positions, i.e., the lower position and the side position of the variable angle prism on the circumferential surface of the variable angle prism to have a phase interval of about 90°. These two pulse motors are coupled to separate racks 104 (only one is shown in FIG. 9 and the other one is the same structure) by screws, and these racks 104 are coupled to separate image-side frame member arm portions, thus constituting a total of two joint portions.

The operation of the variable angle prism driving mechanism with the above-mentioned arrangement will be sequentially described below.

A case will be examined wherein one (e.g., the yaw motor) of the pulse motors is fixed, and the other pulse motor (e.g., the pitch motor) is driven. When the pitch pulse motor is driven, the rack 104 moves in the optical axis direction according to the lead of the screw, and the image-side frame member arm portion 103a also moves in the optical axis direction accordingly. At this time, since the ball portion 104a formed at the distal end portion of the rack is coupled to the image-side frame member arm portion 103a in a state wherein movement in only the direction parallel to the optical axis is restricted, a linear motion of the rack 104 is converted into a rotation about an axis passing through a center 121c of the variable angle prism. Furthermore, since the yaw pulse motor is fixed, the image-side frame member 103 rotates in the pitch direction about an axis passing through the center 121c of the variable angle prism and the center of the ball portion formed at the distal end portion of the rack for driving the yaw motor.

More specifically, the inclination of one transparent plate of the variable angle prism with respect to the image pickup plane is determined by a total of three rotating center points, i.e., the center of a variable angle prism element, and the centers of the ball portions formed at the distal end portions of the two racks.

The crosstalk of the light deflection apparatus with the above-mentioned arrangement will be described below.

Figure 13:
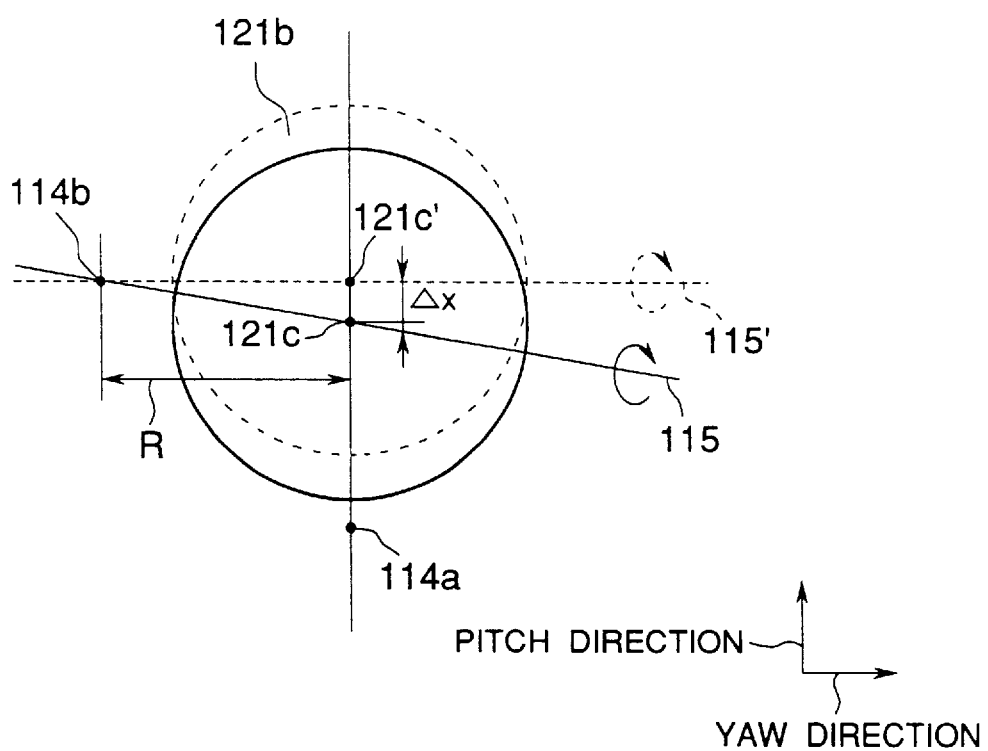
FIG. 13 is an illustration showing a state related to crosstalk.

In the above-mentioned arrangement, when the relative positional relationship between the three center points changes, the pivotal axis shifts accordingly. For example, a case that the rigidities of the films 122a to 122g are not sufficient may cause the following. That is, the films 122a to 122g can not support the weights of the liquid to be sealed, the frame member 103, and the like, the positions of the transparent plates 121b and the frame member 103 shift downward due to the gravity, and the center 121c of the variable angle prism also shifts downward. FIG. 13 is a view of this state viewed from the image plane side.

Referring to FIG. 13, a dotted line represents a state before the transparent plate 121b moves downward, and a solid line represents a state wherein the transparent plate 121b has moved downward. Reference numerals 114a and 114b denote the centers of balls formed at the distal ends of the racks for driving the yaw and pitch motor.

Before the transparent plate 121b moves downward (dotted line), the yaw pulse motor is fixed, and the pitch pulse motor is driven in order to incline the transparent plate 121b in only the pitch direction. A point 114b is fixed, and a driving force acts on a point 114a back and forth on the drawing surface. Consequently, the transparent plate 121b pivots about an axis 115' passing through the point 114b and a center 121c'.

On the other hand, after the transparent plate 121b moves downward (solid line), the yaw pulse motor is fixed, and the pitch pulse motor is driven to cause the transparent plate 121b to pivot about an axis 115 passing through the point 114b and the center 121c.

In this case, although the yaw pulse motor is fixed, and only the pitch pulse motor is driven in order to incline the transparent plate 121b in only the pitch direction, the transparent plate 121b moves including a motion component on the yaw side (pivoting about the axis 115 not parallel to the yaw direction).

That is, when the films have a sufficiently high rigidity, the centering function of the variable angle prism becomes valid. In contrast to this, when the films are not sufficient rigid, the crosstalk is undesirably generated.

When the light deflection apparatus of this embodiment is used in an image blur prevention apparatus for a lens of such as a camera, video camera, or the like, an allowable crosstalk is generally about 5%. When the length from a rotating center to the joint of each ball (represented by R in FIG. 9) is 20 mm, it is apparent from FIG. 13 that a tolerance value $\Delta x$ of the shift between the rotating center in a stationary state and that during operation is about 1 mm. At this time, assume that the diameter (represented by D in FIG. 9) and thickness (represented by t in FIG. 9) of the variable angle prism are 30 mm and 5 mm, respectively. When silicone oil is used as a liquid, and its specific gravity is defined as 1, the weight of the liquid is about 3.5 g, and the weights of the frame member and the like are about 3 g (assuming that a material of the frame member is an engineering plastic), thereby obtaining a total weight of about 6.5 g. The deformation amount may be within 1 mm with respect to a total of about 6.5 g of the movable portions.

That is, the rigidity of the films are set so that the relationship between the length from the rotating center to the joint of each ball (represented by R in FIG. 9) and the tolerance value $\Delta x$ of the shift between the rotating center in a stationary state and that during operation is kept as follow:

$\Delta x/R < 0.05$.

An image blur prevention system using the above-mentioned variable angle prism driving mechanism will be described below.

In the system, fluctuation detection equipment 108 (only one is shown in FIG. 9) for detecting fluctuations in both the pitch and yaw directions, a control circuit 107 such as a microcomputer for controlling the pulse motors on the basis of outputs from the detection equipment 108, and a pulse motor driving circuit 106 for driving the pulse motors in accordance with the control circuit are added to the above-mentioned mechanism. Note that each of the fluctuation detection equipment 108 in the pitch and yaw directions may comprise an angular velocity detector such as a gyro, and an integration circuit for integrating the output from the detector.

The relationship between the rotor rotational angle per pulse of the pulse motor and the screw pitch, i.e., the moving amount of the rack per pulse of the pulse motor and the rotational angle of the transparent plate of the variable angle prism are set in advance to be predetermined values. If the focal length of a lens inserted on the image pickup element side of the variable angle prism is known, an image shift amount on the image pickup plane, which is generated per pulse, can also be known (the rotational angle of the transparent plate per pulse is preferably set to be a value which causes an image shift on the image pickup plane to be sufficiently smaller than one pixel). Therefore, when the image blur amount of the lens is detected from the outputs from the fluctuation detection equipment 108, the control circuit 107 such as a microcomputer calculates drive amounts of the pulse motors so as to cancel the image blur amount, and the pulse motors are driven, the image blur amount can be corrected.

Note that the control circuit may comprise an analog circuit.

In the sixth embodiment, a linear motor (e.g., a voice coil motor (VCM)) is used in a driving operation in place of a pulse motor.

Figure 12:
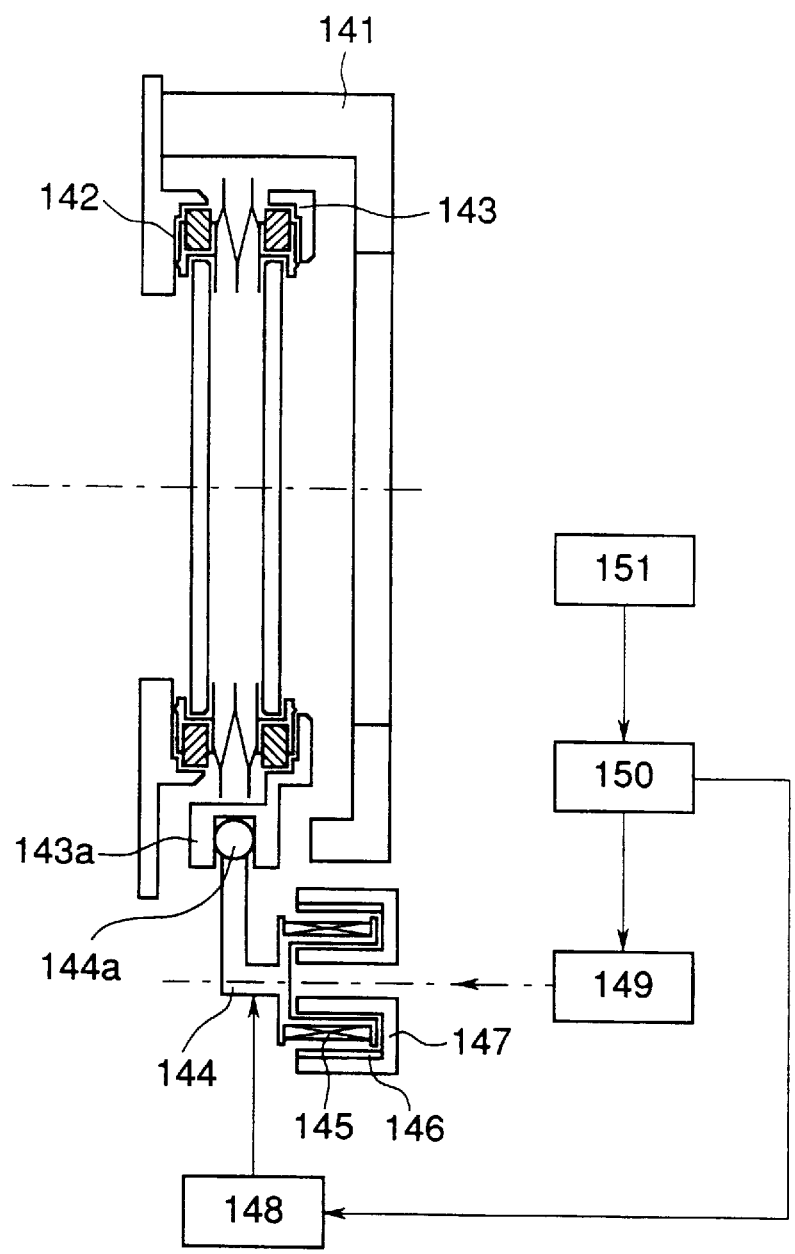
FIG. 12 is a schematic view showing a mechanism and a circuit arrangement of a main part of an optical apparatus according to the sixth embodiment of the present invention.

FIG. 12 shows a mechanism and a circuit arrangement of a main part of an optical apparatus according to the sixth embodiment of the present invention. The basic arrangement of the mechanism is substantially the same as that of the fifth embodiment, except that VCMs are used in place of the pulse motors.

Referring to FIG. 12, a fixing frame 141, and frames 142 and 143 have the same shapes as those in FIG. 9, and the frames 142 and 143 respectively hold a variable angle prism. A coil 145 is wound in a proper length around a bobbin 144. The distal end of the bobbin 144 has a ball shape, and is coupled to an image-side frame member arm portion 143a. A permanent magnet 146 has a cylindrical shape, and is magnetized in the radial direction from its inner circumferential surface to its outer circumferential surface. A yoke 147 has a "U-shaped" section, and is coupled to the permanent magnet 146, as shown in FIG. 12. A sensor 148 detects the position, in the optical axis direction, of the bobbin 144. The sensor 148 may comprise a combination of a PSD and an IRED; a combination of a magnetoresistive element such as an MR element, a Hall element, or the like, and a magnet; a volume control; or the like. A VCM driving circuit 149 for driving the VCM is connected to a control circuit 150 such as a microcomputer, and the control circuit 150 is connected to fluctuation detection equipments 151 for detecting fluctuations in the pitch and yaw directions. Note that FIG. 12 illustrates only one of each of the members 144 to 149 and 151, and does not illustrate the other one of these members. But structures of these members are the same.

In the sixth embodiment, since the driving mechanism and its operation are the same as those in the fifth embodiment, and an operation executed when an image blur prevention system is constituted using the above-mentioned arrangement will be described below.

Since the permanent magnet 146 and the yoke 147 are arranged, as described above, a magnetic flux is radially generated in the gap of the yoke 147. When the coil 145 is arranged in the gap, and a current flows through the coil, a force is generated in the coil 145 in a direction parallel to the optical axis in accordance with the Fleming's left-hand rule. For this reason, the bobbin 144 moves in a direction parallel to the optical axis. The position, in the optical axis direction, of the bobbin 144 in this case is detected by the sensor 148. Since the sensor output, the transparent plate rotational angle, and the image blur amount on an image pickup element are designed to have a known relationship in advance, the VCMs are controlled by the control circuit 150 with feedback control so that the image blur amount coincides with the fluctuation amounts of the lens obtained from the fluctuation detection equipment 151, thus correcting the amount of image blur.

Furthermore, in this embodiment, since the linear motors (VCMs in this embodiment) are used in place of the pulse motors, a low-noise apparatus can be realized as compared to the fifth embodiment.

In the respective embodiments described above, the transparent plate 121b corresponds to an optical member of the present invention; the film 122, corresponds to a coupling member of the present invention; and the liquid filled in the space sealed by the transparent plates 121a and 121b, and the film 122, corresponds to a transparent material of the present invention.

In each of the above embodiments, spherical guide means need not always have a perfect spherical shape but may have a net-like shape as long as it can spherically guide another member.

The arrangements of the above embodiments may be combined.

In each of the above embodiments, the light deflection apparatus is applied to a photographing apparatus such as a camera. In addition, the light deflection apparatus may be applied to light deflectors in optical communications, image blur prevention mechanisms for telescopes, convergence adjustment mechanisms for stereoscopes, an application to a non-visible (inaccessible) portion in, e.g., tunnel constructions, bar code readers, and the like.

The light beam deflection apparatus of the present invention can be applied to not only the image blur prevention function but also to, e.g., tracking, a change in irradiation direction, and the like.

As described above, according to the above-mentioned embodiments, a light deflection apparatus which has a simple structure and high precision without increasing its size can be provided.

Furthermore, the coupling member for coupling the movable optical member to the stationary member has sufficient rigidity with which the coupling member is not improperly deformed by the weights of the movable optical member, the transparent material, and the coupling member. Therefore, a special support means for movably supporting the movable optical member need not be formed, resulting in a decrease in the number of components. The apparatus with a simple arrangement thus be obtained.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A light beam deflection apparatus, comprising:
   a first member;
   a second member, said second member being inclined with respect to said first member and for deflecting a light beam; and
   a coupling member for coupling said second member with said first member with a changeable inclination angle, said coupling member having a rigidity satisfying a relationship $\Delta X/R > 0.05$, wherein when said second member receives a force for changing the inclination angle with respect to said first member in a state where said first member is held and when said second member is adapted to move along a direction which is at least different from the direction of the force, $\Delta X$ is a displacement amount with which said second member is moved with respect to said first member due to the operation of gravity, and R is the distance between an operation position of the force and a rotation center about which the inclination angle of said second member is changed with respect to said first member by receiving the force in a state where said second member does not move with respect to said first member due to gravity.

2. An apparatus according to claim 1, wherein said second member comprises an optical member.

3. An apparatus according to claim 2, wherein said second member comprises a plate-shaped member transparent to light.

4. An apparatus according to claim 1, wherein said coupling member comprises means for sealing a deformable material transparent to light with said first and second members.

5. An apparatus according to claim 1, wherein said coupling member comprises a film member.

6. An apparatus according to claim 1, further comprising driving means for moving said second member at a slant by applying the force to the operation position.

7. An image blur prevention apparatus, comprising:

a first member;

a second member, said second member being inclined with respect to said first member and for deflecting a light beam;

a coupling member for coupling said second member with said first member with a changeable inclination angle, said coupling member having a rigidity satisfying a relationship $\Delta X/R > 0.05$, wherein when said second member receives a force for changing the inclination angle with respect to said first member in a state where said first member is held and when said second member is adapted to move along a direction which is at least different from the direction of the force, $\Delta X$ is a displacement amount with which said second member is moved with respect to said first member due to the operation of gravity, and R is the distance between an operation position of the force and a rotation center about which the inclination angle of said second member is changed with respect to said first member by receiving the force in a state where said second member does not move with respect to said first member due to gravity; and driving means for applying the force for moving said second member at a slant with respect to said first member so as to prevent blurring of an image formed by a light beam passing through said second member.

8. An apparatus according to claim 7, wherein said second member comprises an optical member.

9. An apparatus according to claim 8, wherein said second member comprises a plate-shaped member transparent to light.

10. An apparatus according to claim 7, wherein said coupling member comprises means for sealing a deformable material transparent to light with said first and second members.

11. An apparatus according to claim 7, wherein said coupling member comprises a film member.

* * * * *

UNITED STATES PATENT AND TRADEMARK OFFICE
CERTIFICATE OF CORRECTION

PATENT NO.    : 5,844,719

DATED         : December 1, 1998

INVENTOR(S)   : HIROYUKI WADA

It is certified that error appears in the above-identified patent and that said Letters Patent is hereby corrected as shown below:

COLUMN 1,
Line 43, "IRED,(infrared" should read --IRED, (infrared--.

COLUMN 5,
Line 42, "$\Lambda_p$ and $\Lambda_y$" should read --$\theta_p$ and $\theta_y$--.

COLUMN 6,
Line 12, "f $\alpha$ = 80 mm" should read --f = 80 mm--.

COLUMN 7,
Line 36, "an" should read --a--.

COLUMN 11,
Line 47, "weights" should read --weight--.

COLUMN 12,
Line 14, "sufficient" should read --sufficiently--;
Line 15, "the" should be deleted; and
Line 39, "follow:" should read --follows:--.

UNITED STATES PATENT AND TRADEMARK OFFICE
CERTIFICATE OF CORRECTION

PATENT NO. : 5,844,719

DATED : December 1, 1998

INVENTOR(S): HIROYUKI WADA

It is certified that error appears in the above-identified patent and that said Letters Patent is hereby corrected as shown below:

<u>COLUMN 14</u>,
Line 38, "thus" should read --can thus--.

Signed and Sealed this

Twenty-ninth Day of June, 1999

Attest:

Q. TODD DICKINSON

*Attesting Officer*         *Acting Commissioner of Patents and Trademarks*